No. 743,008. PATENTED NOV. 3, 1903.
J. A. LOW.
MACHINE FOR CONVEYING AND LOADING.
APPLICATION FILED AUG. 11, 1902.
NO MODEL. 3 SHEETS—SHEET 2.
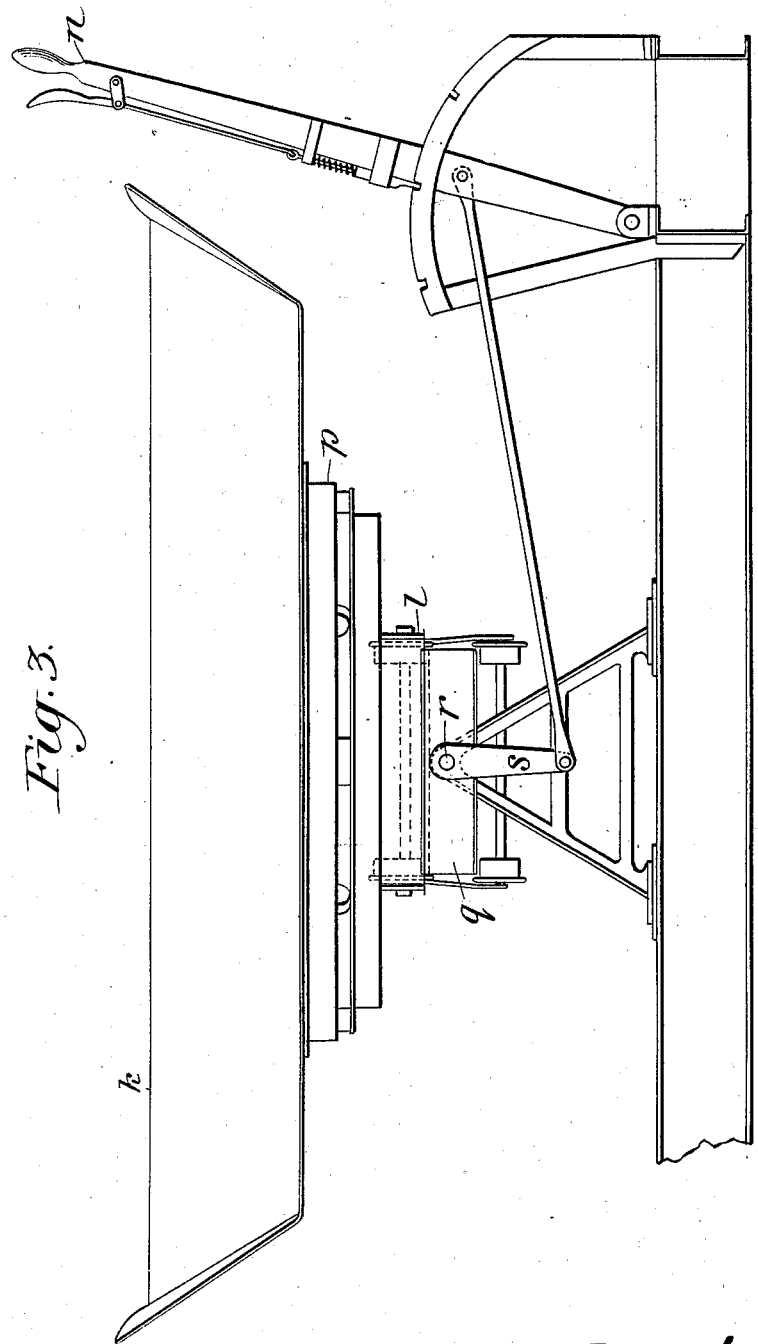

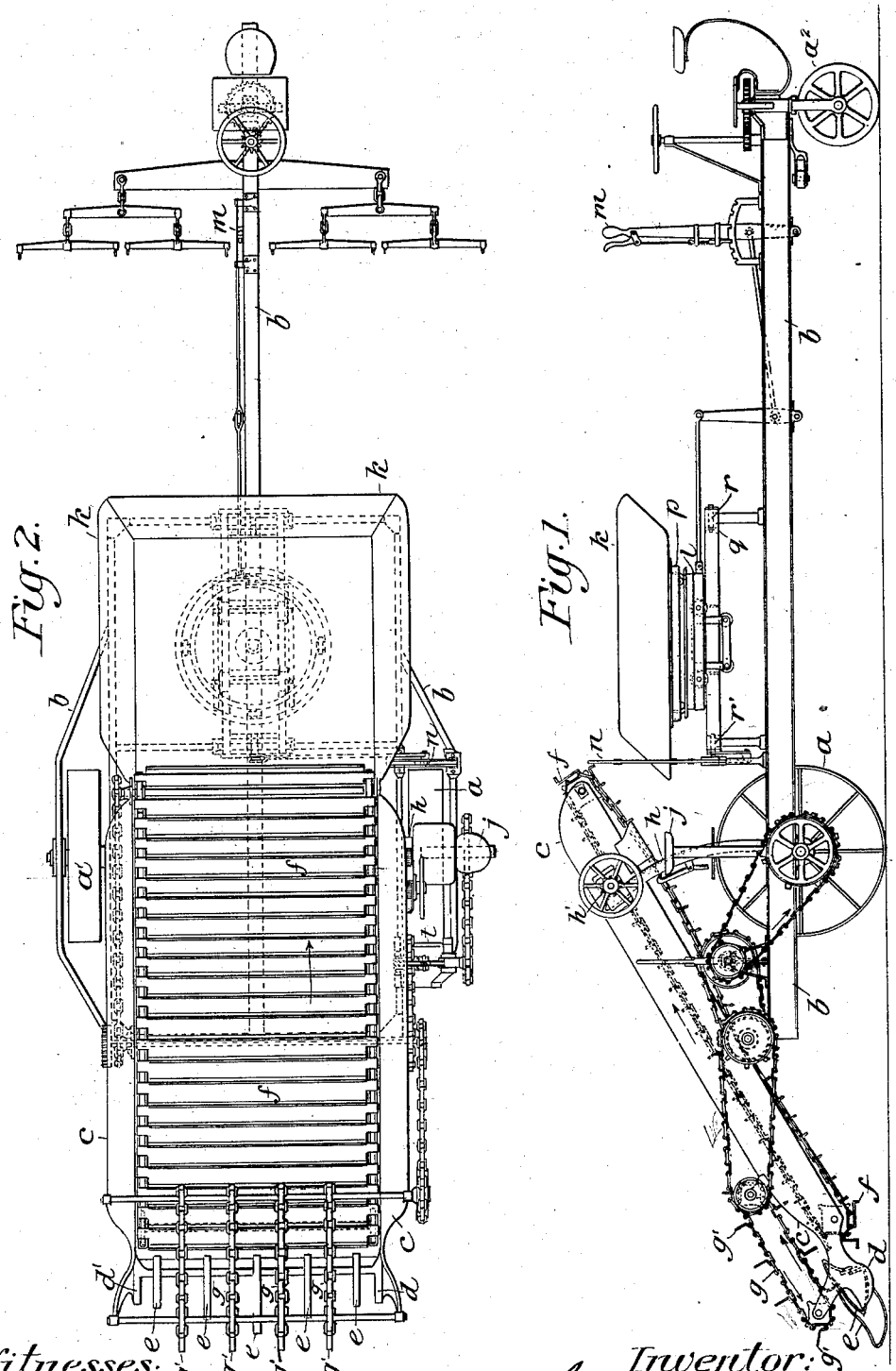

No. 743,008. PATENTED NOV. 3, 1903.
J. A. LOW.
MACHINE FOR CONVEYING AND LOADING.
APPLICATION FILED AUG. 11, 1902.
NO MODEL. 3 SHEETS—SHEET 3.

No. 743,008. Patented November 3, 1903.

UNITED STATES PATENT OFFICE.

JAMES A. LOW, OF AIEA, TERRITORY OF HAWAII.

MACHINE FOR CONVEYING AND LOADING.

SPECIFICATION forming part of Letters Patent No. 743,008, dated November 3, 1903.

Application filed August 11, 1902. Serial No. 119,148. (No model.)

*To all whom it may concern:*

Be it known that I, JAMES A. LOW, a citizen of the United States, residing at Aiea, Island of Oahu, Territory of Hawaii, have invented certain new and useful Improvements in Machines for Conveying and Loading; and I hereby declare the following to be a full, clear, and exact description of the invention, such as will enable others skilled in the art to which it appertains to make and use the same.

My invention is designed principally for use in sugar-cane fields, and is intended to lift the cut cane from the ground, convey it to a suitable elevation, drop it upon a receiving-pan, which pan when suitably loaded may be turned and then tilted, so that its load is transferred to a cart, wagon, or sled at either side of the machine at the will of the operators. It is applicable either on hilly or level ground, on irrigated or unirrigated lands.

Figure 4:
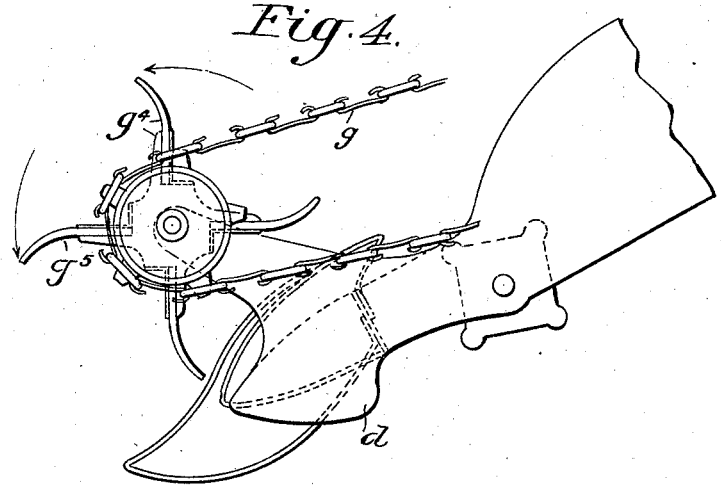
Figure 5:
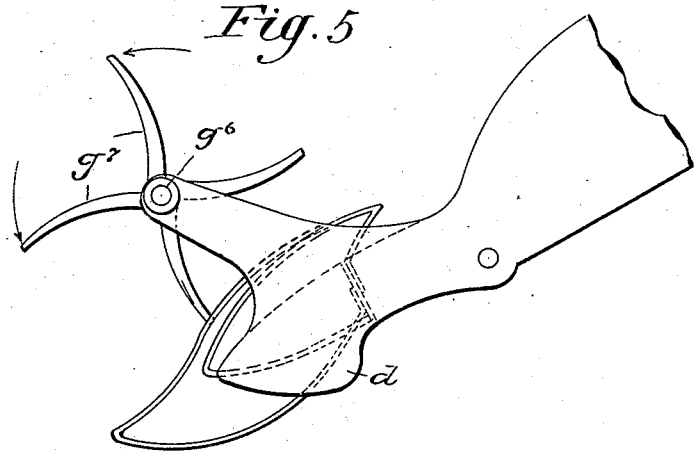

In the accompanying drawings, Figure 1 represents a vertical elevation of the apparatus embodying my invention. Fig. 2 represents the same in a top plan view. Fig. 3 represents a vertical elevation of receiving-pan looking toward the rear of machine. Figs. 4 and 5 represent modified forms of collectors or forwarding apparatus.

Similar letters of reference indicate similar parts throughout the views.

Referring to the drawings, it will be noted that the machine is adapted to be mounted on two large wheels $a$ $a'$, located forward, and on a third wheel $a^2$, located at the extreme rear end, of the frame $b$, this wheel $a^2$ being capable of being turned at the will of the operator, hereinafter called the "steersman."

The machine is propelled by horse or mule power, they being located immediately forward of the steering-wheel, requiring from two to six animals, according to the size of the machine. The wheels $a$ $a'$ are preferably located about ten feet apart, so as to run in every other furrow, most furrows being a uniform width of five feet apart.

Mounted upon the forward end of the frame $b$ of the machine is a frame $c$, capable of being tilted. This frame $c$ is provided at its forward end on both sides with a shoe $d$ $d'$ to prevent the fingers $e$ from digging into the ground. This frame $c$ carries a slat conveyer or elevator $f$, operated by gearing-sprockets and link belts from the axle of the wheel $a$. Above the forward end of this tiltable conveyer-frame $c$ are two shafts with sprocket-wheels mounted thereon, around which travel link belt chains $g$, being also operated from the same axle of the wheel $a$. At intervals along the link belts $g$ are attached prongs $g'$, which force the cane coming upon the fingers $e$ up onto the conveyer $f$ and which therefore constitute, with the belts and their actuating mechanism, a forwarding apparatus, rake, collector, or gatherer.

The conveyer-frame $c$ is preferably tilted by a rack $h$ and pinion $h'$, operated by a man, hereinafter called the "operator," located on a seat $j$, approximately over the wheel $a$. At the rear of the tilting elevator and forward of the propelling-animals is a receiving-pan $k$, which receives its load from the conveyer $f$. This pan in arrangement resembles a large square flat scoop without a handle, it having a flat bottom with three flaring sides, and in its normal position the fourth side, which is without flare, is under the overhanging end of the tilting conveyer $c$. Under the pan $k$ is a turn-table or base $p$, which is preferably provided with ball-bearings, so that the pan is capable of being turned in a horizontal plane by the steersman ninety degrees to the right or left of its normal position. The base $p$ is mounted upon a trolley $l$ and is capable of being moved forward or backward by means of the lever $m$, operated by the steersman.

The pan $k$, with its turn-table $p$ and trolley $l$, are capable of being tilted together in a vertical plane, so that the load on the pan may be dumped to either side of the machine. The pan, turn-table, and trolley all being mounted on the frame $q$ in trunnions $r$ $r'$ are tilted by the operator at the proper time by means of the lever $n$ working on the bell-crank $s$.

In lieu of the link belts $g$ with attached prongs $g'$, which constitute one form of rake or collector, I may use a built-up drum $g^3$ with paddles $g^4$, into which teeth $g^5$ may be inserted, if desired. This drum arrangement being mounted on a shaft driven in the same manner as the link belts $g$ may be substituted for the rake or collector before mentioned. This is shown in Fig. 4. Or in substitution of either of the above-described rakes or collectors I may use a shaft $g^6$ with radial arms $g^7$, attached and driven in the same manner. This is shown in Fig. 5. These latter arrangements are adapted to be used for handling short cane, cane-tops, and leaves, the first-mentioned arrangement being employed for long cane.

A clutch $t$ on an intermediate shaft is provided, so that the machine may be transported from one field to another, for example, without driving either the conveyer $f$ or the chains $g$, the clutch being under the control of the operator, the conveyer-frame $c$ being tilted so that the shoes $d\ d'$ and the fingers $e$ are well up from and clear of the ground.

To use the machine, it is only required that the cane when cut be laid upon the field in rows at right angles to the furrows. The machine is moved forward, being guided by the steersman along the furrows, the operator tilting the conveyer at a suitable angle, such as will permit the fingers to be pushed under the cut cane and with such force that the cane slides up over the fingers, the peculiar shape of which allows the teeth of the rotary rake or collector—viz., the prongs attached to the link belt chains, the teeth $g^5$ on the drum $g^3$, or the arms $g^7$ on shaft $g^6$—to force or rake the cane onto the conveyer. As soon as the cane is on the conveyer it is carried up the incline and dumped onto the receiving-pan, which has been pushed forward on its trolley by the steersman, the cane lying on the pan at right angles to the center line of the machine, as it did upon the conveyer. As the pan fills up the steersman draws the same backward on its trolley. When the pan is sufficiently loaded, the forward motion of the machine is stopped. The steersman turns the pan to one side of the machine, and the operator dumps the load upon the wagon, cart, or sled which has been driven up to the side of the machine, the said vehicle receiving the load of cane parallel to the center line of the machine, the pan being, as stated, arranged to be turned to either side and tilted either way, permitting the cart, wagon, or sled to approach the most advantageous side of the machine under the existing conditions.

Having thus fully described my invention, what I claim as new, and desire to secure by Letters Patent, is—

1. A machine for conveying and loading crops and the like, comprising a main frame, supporting-wheels therefor, an auxiliary frame pivoted to said main frame and adapted to be tilted forward and downward in respect thereto, an elevating-conveyer carried by said auxiliary frame, fingers projecting from the forward end of said auxiliary frame connected to said frame and movable therewith, and a moving rake or collector mounted above and coöperating with the fingers for forwarding the material along said fingers to the conveyer; substantially as described.

2. A machine for conveying and loading crops and the like, comprising a main frame, supporting-wheels therefor, an auxiliary frame pivoted to said main frame and adapted to be tilted forward and downward in respect thereto, an elevating-conveyer carried by said auxiliary frame, fingers projecting from the forward end of said auxiliary frame connected to said frame and movable therewith, and a rotary rake or collector mounted above and coöperating with the fingers for forwarding the material along said fingers to the conveyer; substantially as described.

3. A machine for conveying and loading crops and the like, comprising a main frame, supporting-wheels therefor, an auxiliary frame pivoted to said main frame and adapted to be tilted forward and downward in respect thereto, an elevating-conveyer carried by said auxiliary frame, fingers projecting from the forward end of said auxiliary frame connected to said frame and movable therewith, and a rotary rake or collector comprising sprocket-chains provided with projecting teeth coöperating with the fingers for forwarding the material along said fingers to the conveyer; substantially as described.

4. A machine for conveying and loading crops and the like, comprising a main frame, supporting-wheels therefor, an auxiliary frame pivoted to said main frame and adapted to be tilted forward and downward with respect thereto, an elevating-conveyer carried by said auxiliary frame, fingers projecting from the forward end of said auxiliary frame connected to said frame and movable therewith, a rotary rake or collector coöperating with the fingers for forwarding the material along said fingers to the conveyer, a receiving-pan on said frame, and means for reciprocating, rotating and tilting said pan; substantially as described.

5. A machine for conveying and loading crops and the like, comprising a main frame, an auxiliary frame pivoted to said main frame and adapted to be tilted forward and downward with respect thereto, an elevating-conveyer carried by said auxiliary frame, fingers projecting from the forward end of said auxiliary frame connected to said frame and movable therewith, a rotary rake mounted above the forward end of said conveyer and coöperating with said fingers to forward the material along said fingers to the conveyer, and a receiving-pan on said main frame adjacent to the delivery end of said conveyer; substantially as described.

6. In a machine of the kind described, a traveling support, a pivoted conveyer thereon, fingers on the forward end of the frame in advance of the conveyer, a rotary rake mounted above said fingers and adapted to forward the material along said fingers to the conveyer, a pivoted track on said support, a trolley mounted upon said track and a rotary pan on said trolley; substantially as described.

7. In a machine of the class described, a traveling support, a pivoted track on said support, a reciprocating trolley on said track, and a rotary pan on said trolley; substantially as described.

8. In a machine of the class described, a traveling support, a pivoted track on said support, a reciprocating trolley on said track, a rotary pan on said trolley, and means for gathering and forwarding material to said pan; substantially as described.

In testimony whereof I have signed my name to this specification in the presence of two subscribing witnesses.

JAMES A. LOW.

Witnesses:
 ROBT. J. PRATT,
 GEO. W. CONNON.